(12) United States Patent
Snider (10) Patent No.: US 9,579,955 B2
(45) Date of Patent: Feb. 28, 2017

(54) REAR SLIDER WINDOW ASSEMBLY WITH HEATED MOVABLE WINDOW

(71) Applicant: MAGNA MIRRORS OF AMERICA, INC., Holland, MI (US)

(72) Inventor: Darin J. Snider, Holland, MI (US)

(73) Assignee: MAGNA MIRROS OF AMERICA, INC., Holland, MI (US)

( * ) Notice: Subject to any disclaimer, the term of this patent is extended or adjusted under 35 U.S.C. 154(b) by 0 days.

(21) Appl. No.: 14/834,835

(22) Filed: Aug. 25, 2015

(65) Prior Publication Data

US 2016/0059675 A1    Mar. 3, 2016

Related U.S. Application Data

(60) Provisional application No. 62/041,949, filed on Aug. 26, 2014.

(51) Int. Cl.
*B60J 1/18*  (2006.01)

(52) U.S. Cl.
CPC .................. *B60J 1/1853* (2013.01)

(58) Field of Classification Search
CPC .. B60J 1/1853; B60J 1/002; B60J 1/18; F16C 1/26; Y10T 74/20456
USPC .......................... 49/380, 352, 413
See application file for complete search history.

(56) References Cited

U.S. PATENT DOCUMENTS

| | | |
|---|---|---|
| 957,728 A | 5/1910 | Bliss |
| 1,204,702 A | 11/1916 | Schupp |
| 2,762,675 A | 9/1956 | Janows |
| 2,858,408 A | 10/1958 | Barroero |
| 2,912,714 A | 11/1959 | Rich |
| 2,962,773 A | 12/1960 | Heller |
| 3,177,989 A | 4/1965 | Di Chiaro |
| 3,237,250 A | 3/1966 | Scoville |
| 3,379,859 A | 4/1968 | Marriott |
| 3,508,361 A | 4/1970 | Ryder |
| 3,715,707 A | 2/1973 | Anderson |
| 3,893,260 A | 7/1975 | Cadiou |
| 3,898,427 A | 8/1975 | Levin et al. |
| 3,911,245 A | 10/1975 | O'Shaughnessy |
| 3,964,068 A | 6/1976 | Torii et al. |
| 3,995,142 A | 11/1976 | Ciardelli et al. |
| 4,009,734 A * | 3/1977 | Sullivan ................. B29C 53/12 138/118 |
| 4,023,008 A | 5/1977 | Durussel |

(Continued)

*Primary Examiner* — Justin Rephann
(74) *Attorney, Agent, or Firm* — Gardner, Linn, Burkhart & Flory, LLP (57) ABSTRACT

A rear slider window assembly for a vehicle includes a frame portion having an upper rail and a lower rail, a fixed window panel that is fixed relative to the frame portion, and a movable window panel that is movable along the upper and lower rails. The movable window panel has a first electrical element established at a surface thereof. The first electrical element is in electrical connection with a vehicle power source via a flexible cable having one end electrically connected to the first electrical element at the movable window panel and another end electrically connected to a second electrical connector at the fixed window panel. The flexible cable flexes in response to movement of the movable window panel relative to the fixed window panel. A wire guide is disposed at the fixed window panel and the flexible cable is routed along the wire guide.

12 Claims, 10 Drawing Sheets

(56) References Cited

U.S. PATENT DOCUMENTS

| | | |
|---|---|---|
| 4,065,848 A | 1/1978 | Dery |
| 4,081,926 A | 4/1978 | Jardin |
| 4,124,054 A | 11/1978 | Spretnjak |
| 4,137,447 A | 1/1979 | Boaz |
| 4,158,270 A | 6/1979 | Cherbourg et al. |
| 4,171,594 A | 10/1979 | Colanzi |
| 4,244,774 A | 1/1981 | Dery |
| RE30,663 E | 6/1981 | Schnitzius |
| 4,300,408 A * | 11/1981 | Yoshifuji .................. F16C 1/20 508/206 |
| 4,388,522 A | 6/1983 | Boaz |
| 4,410,843 A | 10/1983 | Sauer et al. |
| 4,415,196 A | 11/1983 | Baum et al. |
| 4,450,346 A | 5/1984 | Boaz |
| 4,458,445 A | 7/1984 | Sauer et al. |
| 4,519,443 A | 5/1985 | Sutoh et al. |
| 4,552,611 A | 11/1985 | Dery et al. |
| 4,606,159 A | 8/1986 | Kunert |
| 4,611,849 A | 9/1986 | Trenkler |
| 4,635,398 A | 1/1987 | Nakamura |
| 4,674,231 A | 6/1987 | Radek et al. |
| 4,723,809 A | 2/1988 | Kida et al. |
| 4,738,052 A | 4/1988 | Yoshida |
| 4,785,583 A | 11/1988 | Kawagoe et al. |
| 4,883,940 A | 11/1989 | Tokarz |
| 4,920,698 A | 5/1990 | Friese et al. |
| 4,934,098 A | 6/1990 | Prouteau et al. |
| 4,970,911 A | 11/1990 | Ujihara et al. |
| 4,995,195 A | 2/1991 | Olberding et al. |
| 5,046,283 A | 9/1991 | Compeau et al. |
| 5,101,682 A * | 4/1992 | Radisch, Jr. ........ A61M 25/005 138/143 |
| 5,146,712 A | 9/1992 | Hlavaty |
| 5,228,740 A | 7/1993 | Saltzman |
| 5,245,788 A | 9/1993 | Riegelman |
| 5,245,887 A * | 9/1993 | Tanaka ...................... F16C 1/26 74/500.5 |
| 5,294,168 A | 3/1994 | Kronbetter |
| 5,308,247 A | 5/1994 | Dyrdek |
| 5,333,411 A | 8/1994 | Tschirschwitz et al. |
| 5,345,717 A | 9/1994 | Mori et al. |
| 5,363,596 A | 11/1994 | Kronbetter |
| 5,367,827 A | 11/1994 | Tajima et al. |
| 5,442,880 A | 8/1995 | Gipson |
| 5,466,911 A | 11/1995 | Spagnoli et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,525,401 A | 6/1996 | Hirmer |
| 5,531,046 A | 7/1996 | Kollar et al. |
| 5,542,214 A | 8/1996 | Buening |
| 5,572,376 A | 11/1996 | Pace |
| 5,613,323 A | 3/1997 | Buening |
| 5,617,675 A | 4/1997 | Kobrehel |
| 5,711,112 A | 1/1998 | Barten et al. |
| 5,716,536 A | 2/1998 | Yokoto et al. |
| 5,724,769 A | 3/1998 | Cripe et al. |
| 5,724,771 A | 3/1998 | Gipson |
| 5,784,833 A | 7/1998 | Sponable et al. |
| 5,799,444 A | 9/1998 | Freimark et al. |
| 5,799,449 A | 9/1998 | Lyons et al. |
| 5,822,922 A | 10/1998 | Grumm et al. |
| 5,836,110 A | 11/1998 | Buening |
| 5,839,476 A * | 11/1998 | Blase ...................... F16G 13/16 138/110 |
| 5,853,895 A | 12/1998 | Lewno |
| 5,890,321 A | 4/1999 | Staser et al. |
| 5,953,887 A | 9/1999 | Lucas et al. |
| 5,996,284 A | 12/1999 | Freimark et al. |
| 5,997,793 A | 12/1999 | Lahnala |
| 6,014,840 A | 1/2000 | Ray et al. |
| 6,026,611 A | 2/2000 | Ralston et al. |
| 6,038,819 A | 3/2000 | Klein |
| 6,086,138 A | 7/2000 | Xu et al. |
| 6,112,462 A | 9/2000 | Kolar |
| 6,119,401 A | 9/2000 | Lin et al. |
| 6,119,402 A | 9/2000 | Wisner |
| 6,125,585 A | 10/2000 | Koneval et al. |
| 6,161,894 A | 12/2000 | Chapman |
| 6,223,470 B1 | 5/2001 | Millard et al. |
| 6,225,904 B1 | 5/2001 | Jaffe et al. |
| 6,250,175 B1 * | 6/2001 | Noetzold .................. F16C 1/20 74/502.3 |
| 6,293,609 B1 | 9/2001 | Xu et al. |
| 6,324,788 B1 | 12/2001 | Koneval et al. |
| 6,328,243 B1 | 12/2001 | Yamamoto |
| 6,490,832 B1 | 12/2002 | Fischbach et al. |
| 6,494,496 B1 * | 12/2002 | Sweeney ................. F16L 35/00 138/110 |
| 6,525,659 B2 | 2/2003 | Jaffe et al. |
| 6,591,552 B1 | 7/2003 | Rasmussen |
| 6,598,931 B2 | 7/2003 | Tamura |
| 6,691,464 B2 | 2/2004 | Nestell et al. |
| 6,742,819 B2 | 6/2004 | So et al. |
| 6,766,617 B2 | 7/2004 | Purcell |
| 6,955,009 B2 | 10/2005 | Rasmussen |
| 7,003,916 B2 | 2/2006 | Nestell et al. |
| 7,010,883 B2 | 3/2006 | Jaerpsten et al. |
| 7,051,478 B2 | 5/2006 | Bourque et al. |
| 7,073,293 B2 | 7/2006 | Galer |
| 7,155,863 B2 | 1/2007 | Daniel et al. |
| 7,184,190 B2 | 2/2007 | McCabe et al. |
| 7,186,118 B2 | 3/2007 | Hansen et al. |
| 7,219,470 B2 | 5/2007 | Lahnala |
| 7,255,451 B2 | 8/2007 | McCabe et al. |
| 7,259,359 B2 | 8/2007 | Davey et al. |
| 7,395,631 B2 | 7/2008 | Lahnala |
| 7,400,435 B2 | 7/2008 | Byers et al. |
| 7,437,852 B2 | 10/2008 | Dufour et al. |
| 7,608,949 B2 | 10/2009 | Busch |
| 7,626,749 B2 | 12/2009 | Baur et al. |
| 7,871,272 B2 | 1/2011 | Firman et al. |
| 7,900,863 B1 | 3/2011 | Cheng |
| 7,934,342 B2 | 5/2011 | Lahnala |
| 7,963,070 B2 | 6/2011 | Recker |
| 8,042,664 B2 | 10/2011 | Rutkowski et al. |
| 8,069,615 B2 | 12/2011 | Heiman et al. |
| 8,127,498 B2 | 3/2012 | Lahnala |
| 8,151,519 B2 | 4/2012 | Bello et al. |
| 8,250,812 B2 | 8/2012 | Hebert et al. |
| 8,272,168 B2 | 9/2012 | Lahnala |
| 8,402,695 B2 | 3/2013 | Smith et al. |
| 8,881,458 B2 | 11/2014 | Snider et al. |
| 8,938,914 B2 * | 1/2015 | Hulst .............................. 49/127 |
| 2003/0074842 A1 | 4/2003 | Eckhardt et al. |
| 2003/0140562 A1 | 7/2003 | Staser et al. |
| 2003/0188487 A1 | 10/2003 | Rasmussen |
| 2003/0188490 A1 | 10/2003 | Kraus et al. |
| 2003/0213179 A1 | 11/2003 | Galer |
| 2004/0020131 A1 | 2/2004 | Galer et al. |
| 2004/0065017 A1 | 4/2004 | Priest et al. |
| 2004/0065018 A1 | 4/2004 | Reginier et al. |
| 2006/0032140 A1 | 2/2006 | Arimoto et al. |
| 2006/0061008 A1 | 3/2006 | Karner et al. |
| 2006/0107600 A1 | 5/2006 | Nestell et al. |
| 2006/0130405 A1 | 6/2006 | Hemond et al. |
| 2006/0179966 A1 * | 8/2006 | Kuo ....................... B60T 11/046 74/502.5 |
| 2007/0209283 A1 | 9/2007 | Ostrowski et al. |
| 2007/0277443 A1 | 12/2007 | Dery et al. |
| 2008/0122262 A1 | 5/2008 | Cicala |
| 2008/0127563 A1 | 6/2008 | Tooker |
| 2008/0155902 A1 | 7/2008 | Kaiser |
| 2008/0202032 A1 | 8/2008 | Loidolt |
| 2009/0071284 A1 * | 3/2009 | Wen ...................... B60T 11/046 74/502.5 |
| 2009/0235773 A1 * | 9/2009 | Wen ........................... F16C 1/26 74/502.4 |
| 2009/0235774 A1 * | 9/2009 | Wen ........................... F16C 1/26 74/502.6 |
| 2009/0322705 A1 | 12/2009 | Halsey, IV |
| 2010/0107505 A1 * | 5/2010 | Schreiner ............ E05D 15/0608 49/413 |

(56) References Cited

U.S. PATENT DOCUMENTS

| | | |
|---|---|---|
| 2010/0146859 A1 | 6/2010 | Gipson et al. |
| 2010/0154312 A1 | 6/2010 | Gipson et al. |
| 2010/0182143 A1 | 7/2010 | Lynam |
| 2010/0240229 A1 | 9/2010 | Firman et al. |
| 2010/0263290 A1 | 10/2010 | Pawloski et al. |
| 2010/0326231 A1* | 12/2010 | Kuo ............... B62M 25/02 74/502.5 |
| 2011/0030276 A1 | 2/2011 | Smith et al. |
| 2011/0034257 A1* | 2/2011 | Wen ............... F16C 1/26 464/173 |
| 2011/0233182 A1 | 9/2011 | Baranski |
| 2011/0262087 A1* | 10/2011 | Bohler ............ G02B 6/4486 385/107 |
| 2012/0091113 A1 | 4/2012 | Bennett et al. |
| 2012/0091114 A1 | 4/2012 | Ackerman et al. |
| 2012/0117880 A1 | 5/2012 | Lahnala et al. |
| 2012/0139289 A1 | 6/2012 | Lahnala |
| 2012/0291353 A1* | 11/2012 | Gipson ............ B60S 1/026 49/70 |
| 2013/0068341 A1* | 3/2013 | Wen ............... B60T 11/046 138/155 |
| 2013/0174488 A1 | 7/2013 | Snider et al. |
| 2013/0255156 A1 | 10/2013 | Snider |
| 2013/0277352 A1 | 10/2013 | Degen et al. |
| 2013/0283693 A1 | 10/2013 | Hulst et al. |
| 2014/0047772 A1 | 2/2014 | Hulst |
| 2014/0091074 A1 | 4/2014 | Lisinski et al. |
| 2015/0298528 A1* | 10/2015 | Lahnala ............ B60J 1/1853 49/70 |

\* cited by examiner

REAR SLIDER WINDOW ASSEMBLY WITH HEATED MOVABLE WINDOW

CROSS REFERENCE TO RELATED APPLICATION

The present application claims the filing benefits of U.S. provisional application Ser. No. 62/041,949, filed Aug. 26, 2014, which is hereby incorporated herein by reference in its entirety.

FIELD OF THE INVENTION

The present invention relates to movable or slider window assemblies for vehicles and, more particularly to a side or rear slider window assembly for a vehicle.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window.

It is known to provide a heating element at the window assembly to defog or defrost the window panels. The fixed window panels typically include respective heater grids that are electrically connected to a power source and are heated responsive to actuation of a user input. The movable window panel typically includes a heater grid that is electrically connected the power source when the movable window panel is closed, whereby electrical terminals at the movable window panel may be electrically connected to or in electrical contact with electrical terminals at the frame or latch, and whereby the movable window panel is not electrically connected to the power source when the movable window panel is opened or partially opened.

SUMMARY OF THE INVENTION

The present invention provides a rear slider window assembly that may provide for defogging or defrosting of the fixed and movable window panels of the rear slider window assembly. The window assembly of the present invention is operable to heat or defog or defrost the movable window panel irrespective of whether the movable window panel is opened or partially opened or closed. The present invention thus provides enhanced capability of heating or defogging or defrosting (or providing electrical power to) the movable window panel (typically the center window panel).

According to an aspect of the present invention, a rear slider window assembly of a vehicle (such as a pickup truck or the like) includes a frame portion having an upper rail and a lower rail, at least one fixed window panel that is fixed relative to the frame portion, and a movable window panel that is movable along the upper and lower rails. The movable window panel is movable between a closed position and an opened position. The at least one fixed window panel has a first electrical element established thereon and the movable window panel has a second electrical element established thereon.

The second electrical element may be electrically connected to the power source of the vehicle via a flexible connector or flexible cable that is connected at one end to the second electrical element at the movable window panel and to another end to an electrical connector. The electrical connector may be disposed at the fixed window panel and may be electrically conductively connected to the first electrical element. The first electrical element may be electrically conductively connected to the vehicle power source via a vehicle wiring harness or the like. The first and second electrical elements may comprise first and second heater grids established on the fixed window panel and the movable window panel, respectively. The movable window panel may include a guide or guiding element at or near the attachment of the flexible connector to the second electrical element, whereby the guide element is configured to move along the flexible connector as the movable window is moved to flatten or smooth the flexible connector or cable and to limit unwanted bending of the flexible connector during movement of the movable window, such as towards its opened position.

These and other objects, advantages, purposes and features of the present invention will become apparent upon review of the following specification in conjunction with the drawings.

DESCRIPTION OF THE PREFERRED EMBODIMENTS

Figure 1:
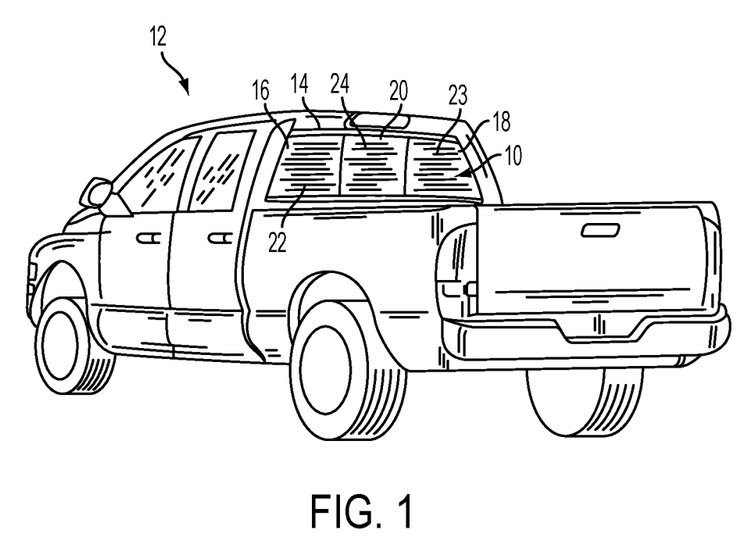
FIG. 1 is a rear perspective view of a pickup truck having a rear slider window assembly in accordance with the present invention.
Figure 2:
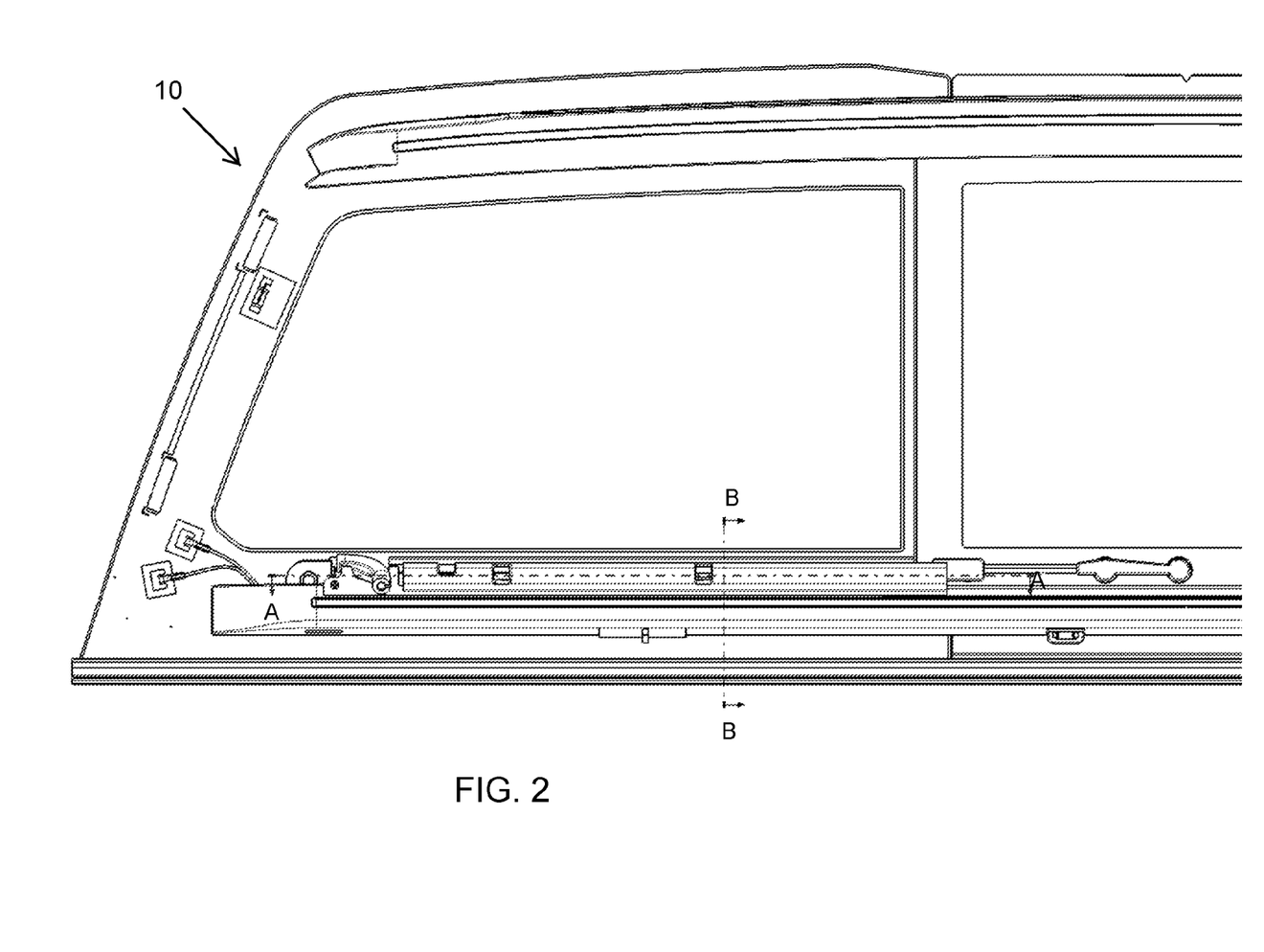
FIG. 2 is a front plan view of a portion of the rear slider window assembly of the present invention, as viewed from the forward or interior side of the window assembly when the window assembly is normally mounted to a vehicle.

Referring now to the drawings and the illustrative embodiments depicted therein, a rear slider window assembly 10 of a vehicle 12 (such as a pickup truck or the like) includes a window frame 14, a pair of side fixed window panels 16, 18 and a movable window panel 20 that is movable relative to frame 14 and fixed window panels 16, 18 between an opened position and a closed position. Fixed window panels 16, 18 each include an electrically conductive heater grid 22, 23 or other heating element or electrically operable element established at the window panels (such as at or on an interior surface of the window panels) and movable window panel 20 includes an electrically conductive heater grid or other heating element or electrically operable element 24 established at the window panel (such as at or on an interior surface of the movable window panel). The heater grids 22, 23 are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels 16, 18. Movable panel heater grid 24 is electrically connected to the power source (and may be electrically connected to electrical terminals or elements at one of the heater grids 22, 23 of the fixed window panels) and may be electrically powered to heat or defrost or defog the movable window panel 20, as discussed below. Heater grids 22, 23, 24 comprise a plurality of electrically conductive traces that extend across the respective window panels 16, 18, 20 between respective busbars to provide enhanced and more uniform heating and defrosting/defogging of the window panel, as also discussed below.

Heater grid 24 of movable window panel 20 is powered in a manner that allows for heating or defogging or defrosting of the movable window panel irrespective of whether the movable window panel is opened or partially opened or closed, as discussed below. In the illustrated embodiments, the electrical connection between the vehicle power source or fixed panel heater grid 22 is electrically connected to movable panel heater grid 24 via a flexible connector or wire or cable, and fixed panel heater grid 22 is electrically connected to fixed panel heater grid 23 via a jumper wire or cable, such as by utilizing aspects of the rear slider window assemblies described in U.S. Pat. No. 8,402,695 and/or U.S. Publication No. US 2013/0174488, which are hereby incorporated herein by reference in their entireties.

In the illustrated embodiment, window assembly 10 includes two fixed window panels 16, 18 that are spaced apart so as to define an opening therebetween. Slider or movable window panel 20 is movable along a lower rail and an upper rail of frame portion 14 to open and close the opening, such as in a manner similar to known slider window assemblies. Optionally, the slider window panel 20 may be disposed at a lower carrier that receives the lower perimeter edge region of the slider window panel 20 therein and that is slidably or movably received in the lower rail of frame portion 14.

Figure 3:
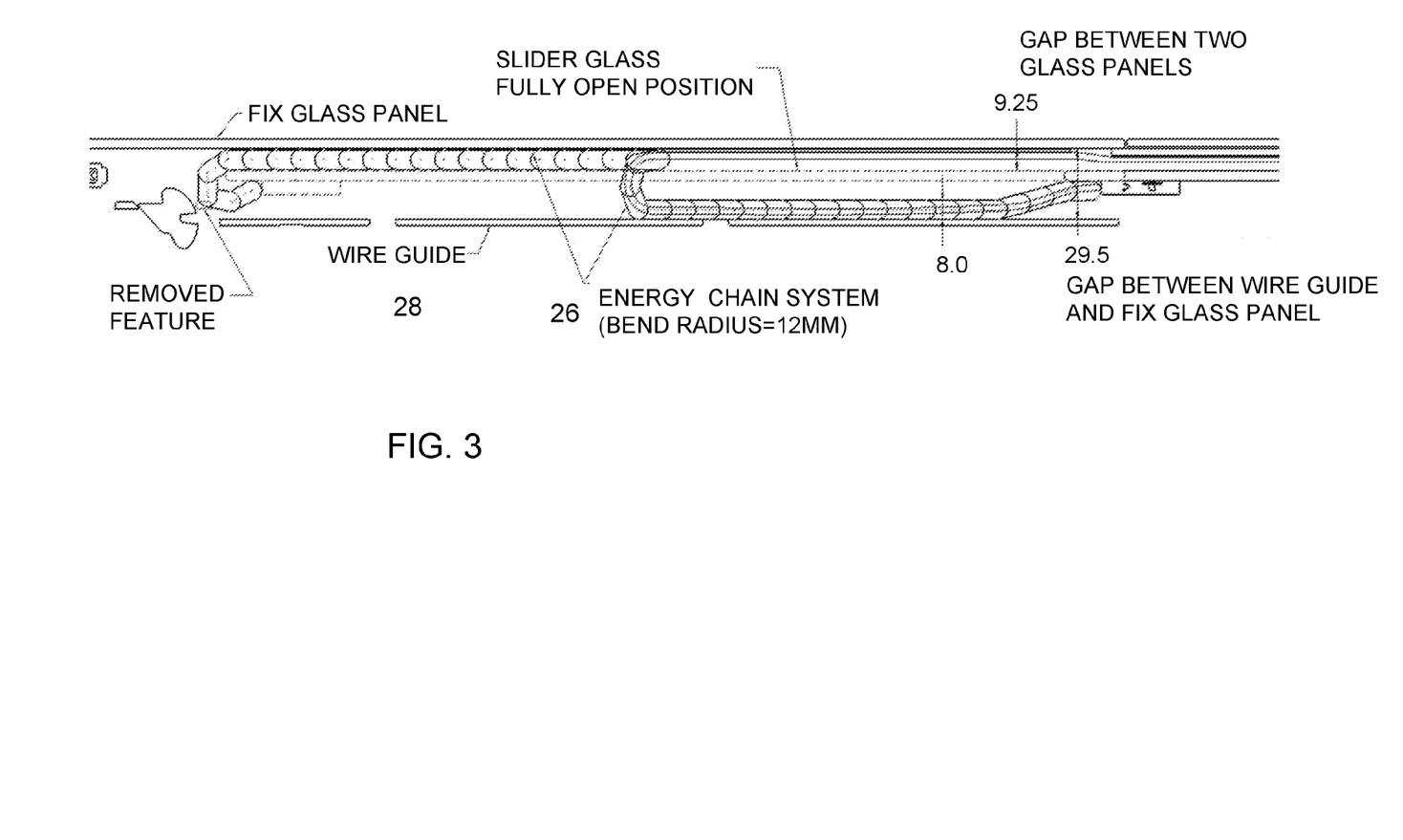
FIG. 3 is a sectional view of the portion of the rear slider window assembly of FIG. 2, taken along the line A-A in FIG. 2.
Figure 4:
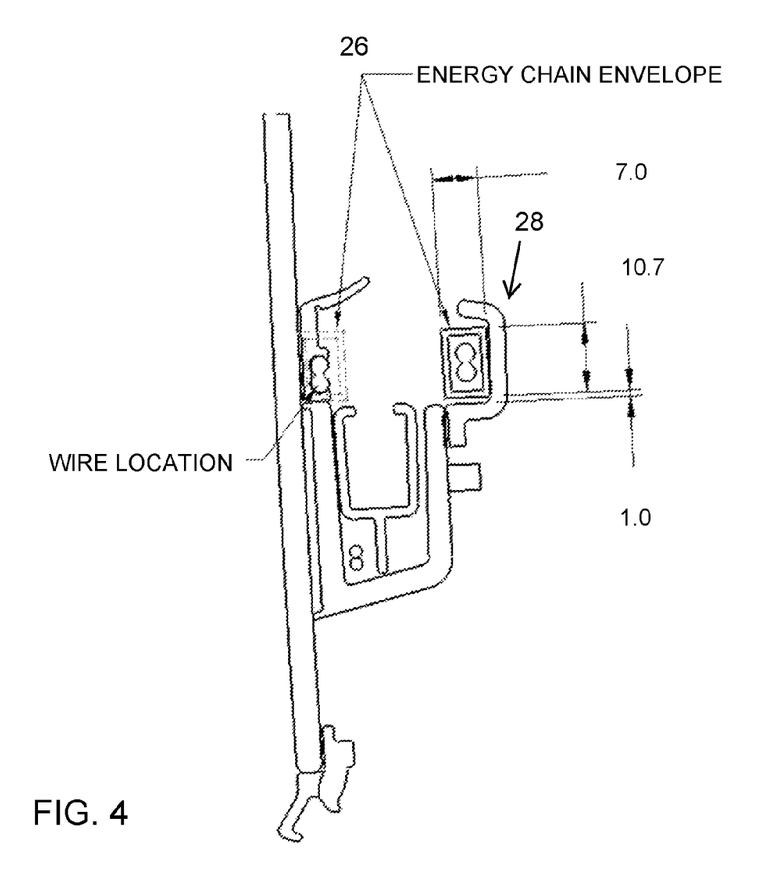
FIG. 4 is a sectional view of the portion of the rear slider window assembly of FIG. 2, taken along the line B-B in FIG. 2.

In the illustrated embodiment of FIGS. 2-4, the window assembly includes a flexible connector 26 that comprises an energy chain system or flexible track mechanism or construction having electrically conductive wires routed along a flexible linked or jointed cable sheath (such as a jointed or linked polymeric chain or track having a wire passageway or channel therealong), such that the cable may flex in one direction (such as in a horizontal direction in FIGS. 3 and 4), while limiting flexing in the other direction (such as in a vertical direction in FIGS. 3 and 4). For example, one end of the wires of flexible cable 26 may be connected to a pair of terminals or busbars at the fixed window panel 16 (where the ends of the wires may be electrically conductively connected to busbars or respective terminals of the heater grid 22 of fixed window panel 16, such as via respective metallic or otherwise electrically conductive traces established at the surface of the fixed window panel and between the respective terminals), while the other end of the wires of flexible cable 26 may connect to a pair of terminals or busbars at movable window panel 20 (where the terminals are electrically conductively connected to or established with the heater grid 24 of movable window panel 20).

As shown in FIGS. 2-4, window assembly 10 includes a wire guide or cover element 28 that is attached (such as via an adhesive or the like) to or formed with the lower channel or rail, and that extends partially along the lower rail or channel of the frame portion 14 of window assembly 10. The cover element 28 includes an attaching portion that is attached to lower rail and includes a wire guide portion or channel that is disposed at or above the lower rail and that receives flexible cable 26 therein to guide and conceal the flexible cable during movement of the movable window panel between its opened and closed positions.

Thus, the flexible cable 26 is routed along and within the guide element or channel 28 to control and guide and conceal the flexible cable. The cover element conceals the flexible cable from view and substantially encases the flexible cable to guide or control the flexing of the cable and to protect the cable from exposure at the window panel.

Figure 5:
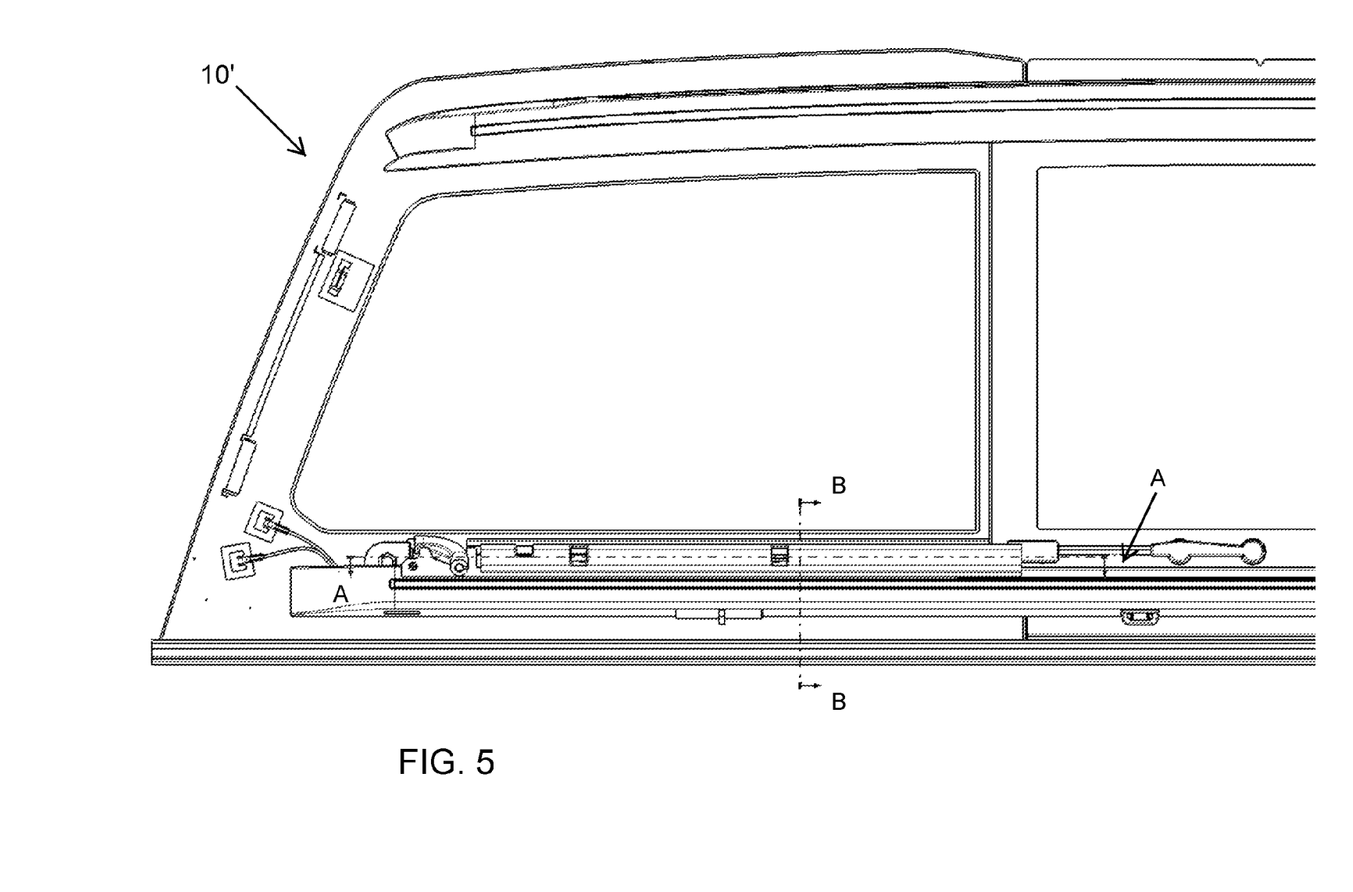
FIG. 5 is a front plan view of a portion of another rear slider window assembly of the present invention, as viewed from the forward or interior side of the window assembly when the window assembly is normally mounted to a vehicle.
Figure 6:
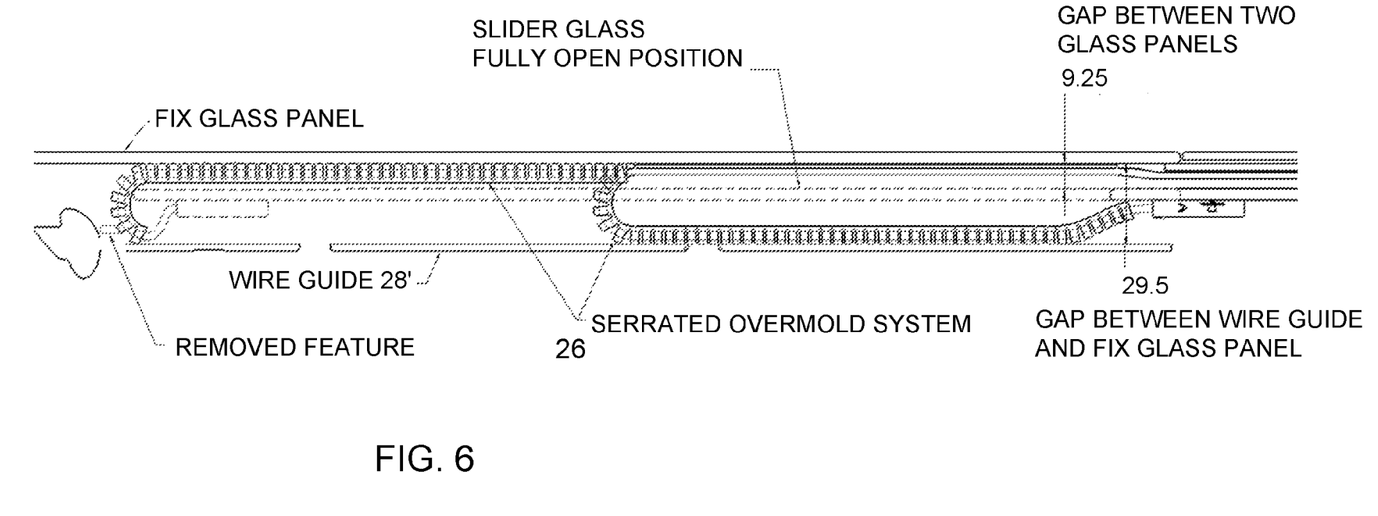
FIG. 6 is a sectional view of the portion of the rear slider window assembly of FIG. 5, taken along the line A-A in FIG. 5.
Figure 7:
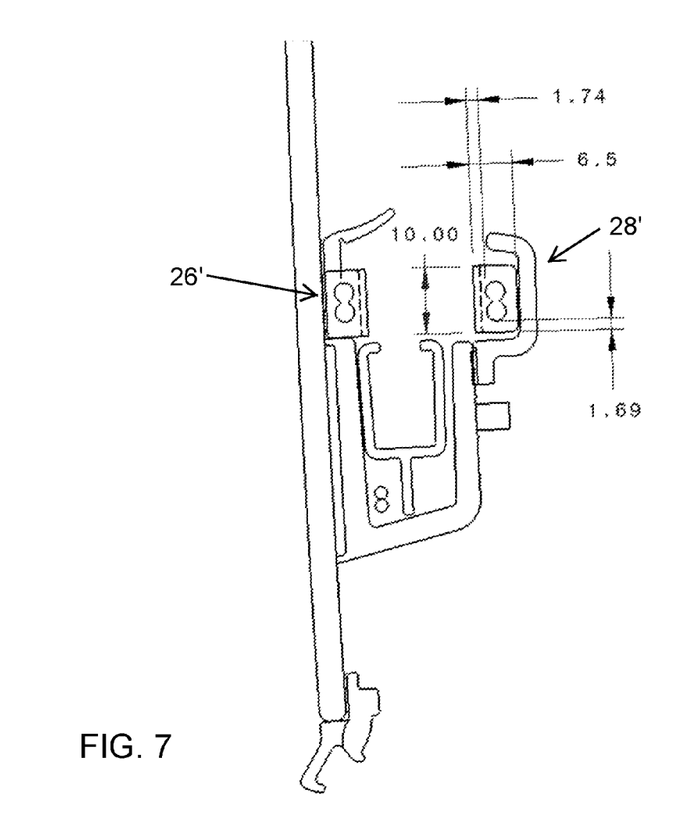
FIG. 7 is a sectional view of the portion of the rear slider window assembly of FIG. 5, taken along the line B-B in FIG. 5.

In the illustrated embodiment of FIGS. 5-7, the window assembly 10' includes a flexible connector 26' that comprises a serrated overmolded polymeric cable sheath that is overmolded (or extruded) over electrically conductive wires routed along the flexible cable sheath, such that the cable may flex in one direction (such as in a horizontal direction in FIGS. 6 and 7), while limiting flexing in the other direction (such as in a vertical direction in FIGS. 6 and 7). One end of the wires of flexible cable 26' may be connected to a pair of terminals or busbars at the fixed window panel (where the ends of the wires may be electrically conductively connected to busbars or respective terminals of the heater grid of the fixed window panel, such as via respective metallic or otherwise electrically conductive traces established at the surface of the fixed window panel and between the respective terminals), while the other end of the wires of flexible cable 26' may connect to a pair of terminals or busbars at the movable window panel (where the terminals are electrically conductively connected to or established with the heater grid of the movable window panel).

As shown in FIGS. 5-7, window assembly 10' includes a wire guide or cover element 28' that is attached (such as via an adhesive or the like) to or formed with the lower channel or rail, and that extends partially along the lower rail or channel of the frame portion of window assembly 10'. The cover element 28' includes an attaching portion that is attached to lower rail and includes a wire guide portion or channel that is disposed at or above the lower rail and that receives flexible cable 26' therein to guide and conceal the flexible cable during movement of the movable window panel between its opened and closed positions.

Figure 8:
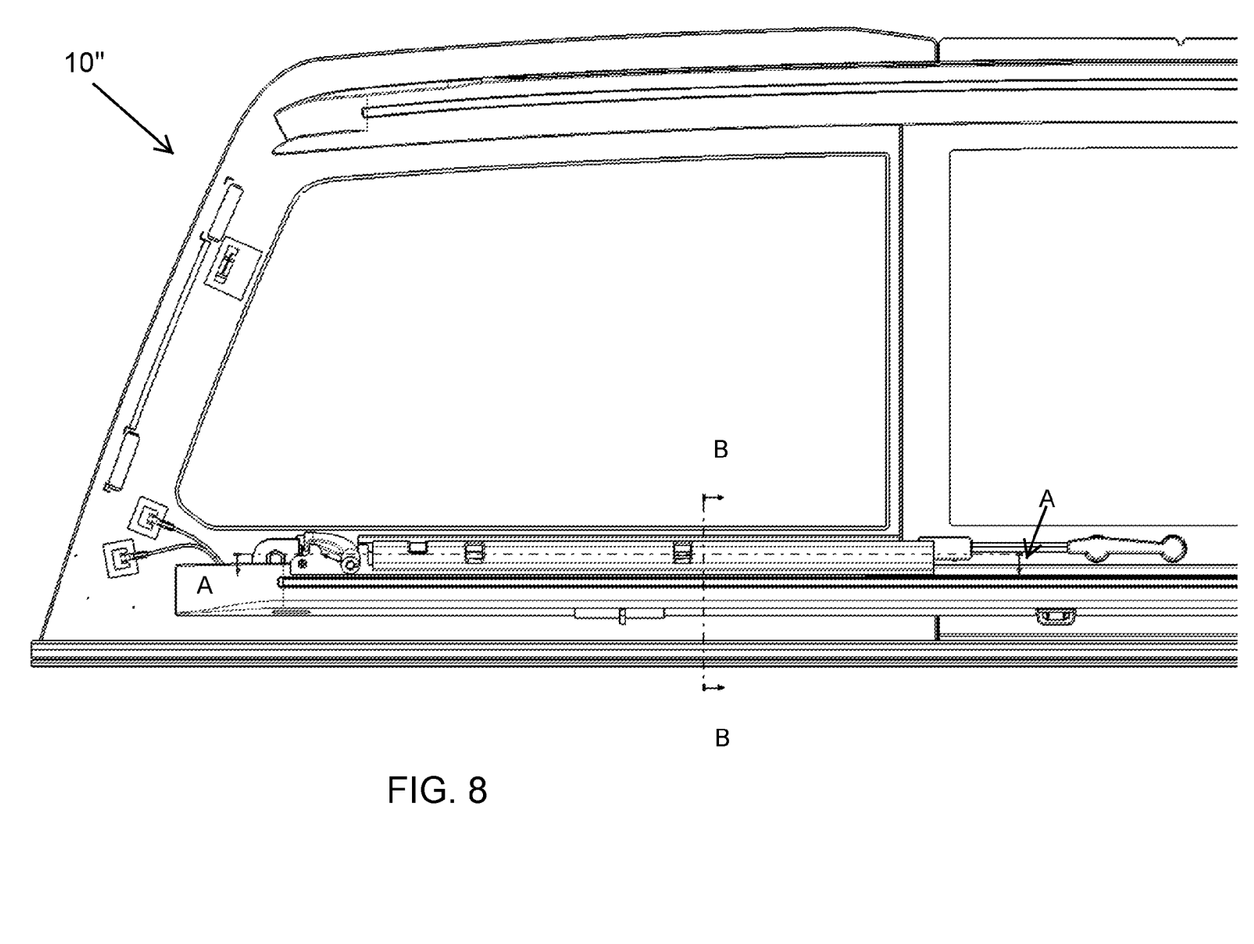
FIG. 8 is a front plan view of a portion of the rear slider window assembly of the present invention, as viewed from the forward or interior side of the window assembly when the window assembly is normally mounted to a vehicle.
Figure 9:
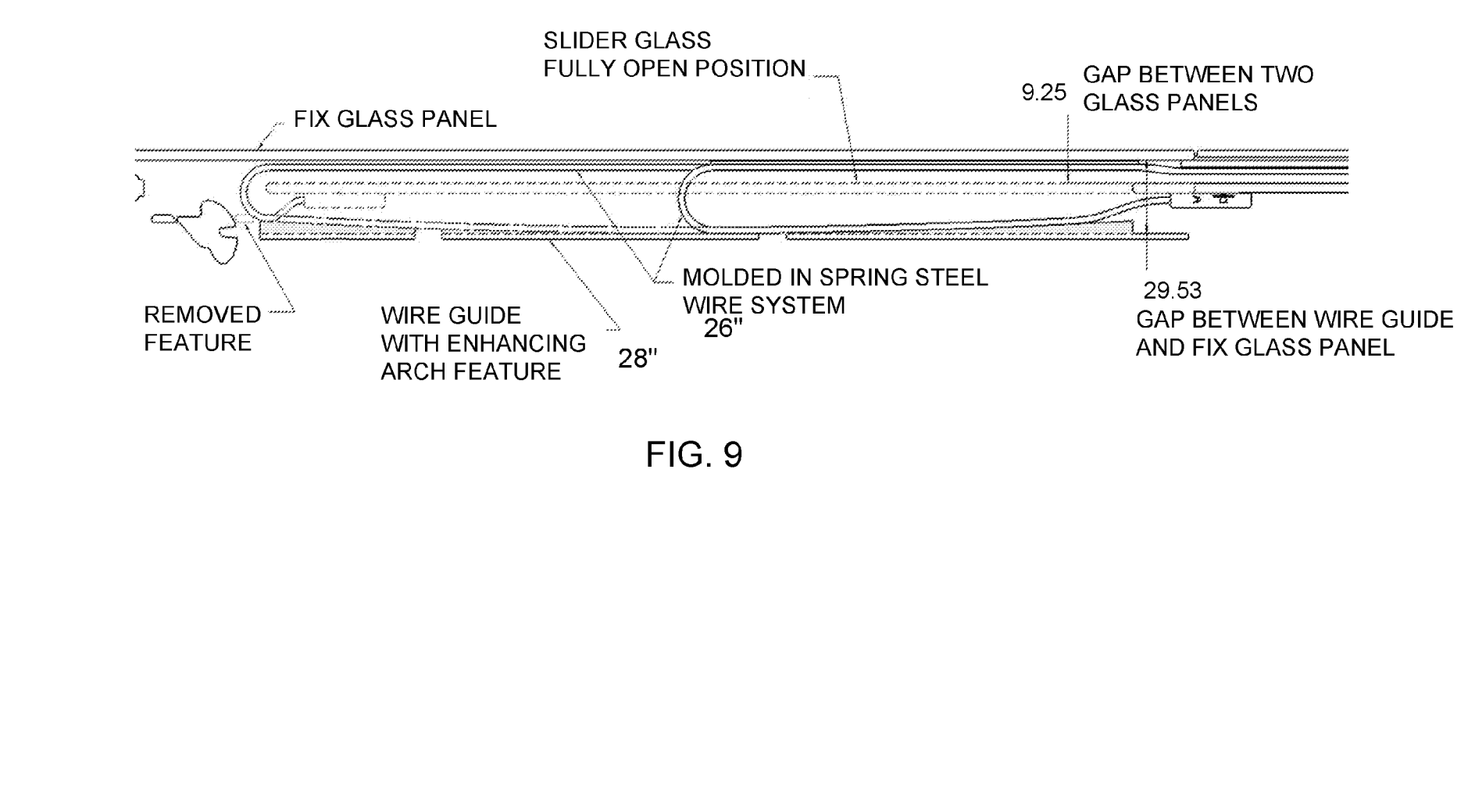
FIG. 9 is a sectional view of the portion of the rear slider window assembly of FIG. 8, taken along the line A-A in FIG. 8.
Figure 10:
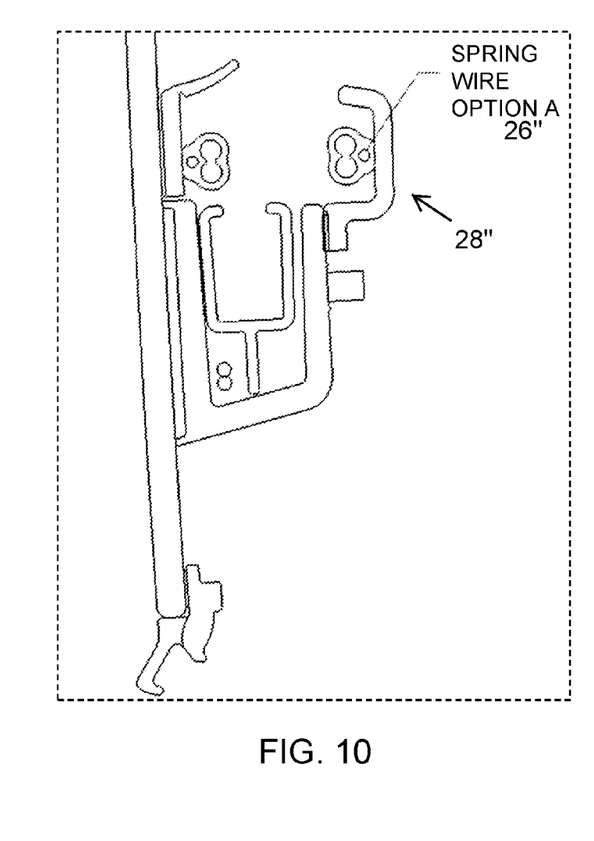
FIG. 10 is a sectional view of the portion of the rear slider window assembly of FIG. 8, taken along the line B-B in FIG. 8.

In the illustrated embodiment of FIGS. 8-10, the window assembly 10" includes a flexible connector 26" that comprises electrically conductive wires along and within a polymeric cable sheath that is at least partially overmolded (or extruded) over a spring wire or metallic flexible element extending at least substantially along the flexible cable sheath. One end of the wires of flexible cable 26" may be connected to a pair of terminals or busbars at the fixed window panel (where the ends of the wires may be electrically conductively connected to busbars or respective terminals of the heater grid of the fixed window panel, such as via respective metallic or otherwise electrically conductive traces established at the surface of the fixed window panel and between the respective terminals), while the other end of the wires of flexible cable 26″ may connect to a pair of terminals or busbars at the movable window panel (where the terminals are electrically conductively connected to or established with the heater grid of the movable window panel).

As shown in FIGS. 8-10, window assembly 10″ includes a wire guide or cover element 28″ that is attached (such as via an adhesive or the like) to or formed with the lower channel or rail, and that extends partially along the lower rail or channel of the frame portion of window assembly 10″. The cover element 28″ includes an attaching portion that is attached to lower rail and includes a wire guide portion or channel that is disposed at or above the lower rail and that receives flexible cable 26″ therein to guide and conceal the flexible cable during movement of the movable window panel between its opened and closed positions.

Figure 11:
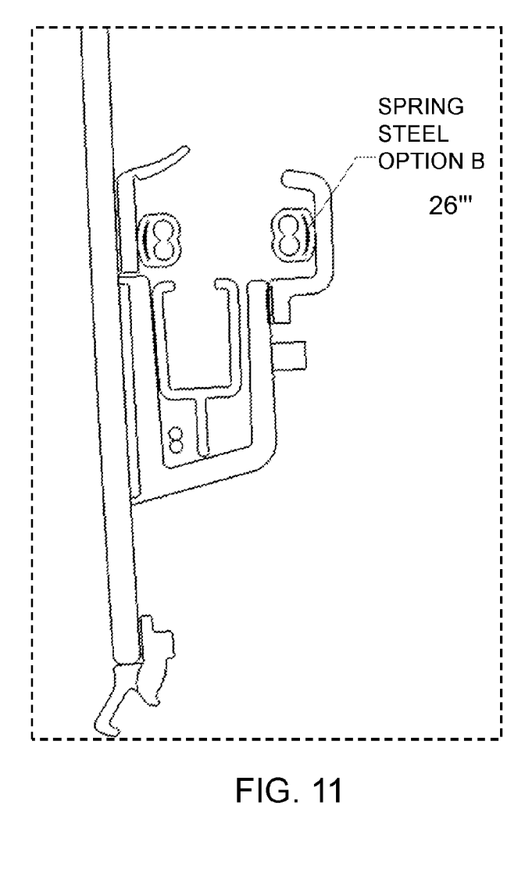
FIG. 11 is a sectional view similar to FIG. 10, showing another wiring or cable of the present invention.

In the illustrated embodiment, the wire guide 28″ has an arcuate inner surface that curves along the wire guide to provide enhanced curving or bending of the cable 26″ as the window is opened and closed. Thus, the spring wire flexes as the window closes and is biased towards its straight orientation and thus straightens as the window is opened (as can be seen in FIG. 9). Optionally, and with reference to FIG. 11, the cable 26‴ may have a spring steel element (such as a curved element) insert molded in the cable sheath to provide the desired flexing of the cable as the window is opened and closed. Such a spring steel element may provide cable flexing in one direction (such as in a horizontal direction in FIG. 11), while limiting flexing in the other direction (such as in a vertical direction in FIG. 11).

Thus, the flexible wire or cable functions to provide electrical connection to the heater grid of the movable window panel throughout the range of motion of the movable window panel between its fully closed position and its fully opened position. As the window panel is moved towards its opened position, the one end of the flexible cable moves with the movable window panel while the flexible cable flexes to allow for such movement. The slider or movable window panel may be movable towards the driver or left side of the vehicle when at least partially opened, or the slider may be moved in the other direction, with the components being generally reversed, depending on the particular application of the rear slider window assembly.

The movable or slider window panel is movable such as via manual pushing or pulling at the window panel or in response to actuation of a drive motor of a drive motor assembly or system, which may move cables or the like to impart horizontal movement of the slider window panel along the rails. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009 and/or 7,073,293, and/or U.S. Publication Nos. 2004/0020131 and/or 2008/0127563, which are all hereby incorporated herein by reference in their entireties.

Optionally, the window assembly or assemblies of the present invention may utilize aspects of the window assemblies described in U.S. Pat. Nos. 8,402,695; 7,073,293; 7,003,916 and/or 6,691,464, and/or U.S. Publication Nos. 2013/0174488; 2006/0107600; 2008/0127563; 2004/0020131 and/or 2003/0213179, which are hereby incorporated herein by reference in their entireties. Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Thus, the present invention provides a movable slider window assembly with a movable window that is moved along rails between an opened and closed position relative to a fixed window panel and aperture or opening formed through the fixed window panel (such as by utilizing aspects of the window assemblies described in U.S. Pat. Nos. 8,322,073; 7,838,115; 7,332,225; 6,846,039; 6,319,344; 6,068,719 and 5,853,895, and/or U.S. Pub. No. US-2011-0056140, which are all hereby incorporated herein by reference in their entireties). The fixed window panel is adhered or bonded to the vehicle body and the window assembly may include separate water drainage receiving conduits for channeling or guiding water draining from the lower rail through the adhesive or sealant bead between the fixed window panel and the vehicle body to drain water from the window assembly. The rails and channel followers and pins function to guide the movable window along the rails and toward the fixed window panel when the movable window is moved to its closed position. The movable window panel thus is movable along the rails and moves between an opened position, where the movable window is disposed inward of the fixed window panel, and a closed position, where the movable window is disposed at the opening in the fixed window panel and at least partially in the opening to provide a generally flush or continuous exterior surface of the fixed and movable window panels when the movable window panel is closed.

Optionally, other means for establishing and maintaining electrical connection to the heater grid of the movable window panel throughout the range of motion of the movable window panel may be implemented while remaining within the spirit and scope of the present invention. Although shown and described as a rear slider window assembly having a pair of side fixed window panels and a single horizontally movable window panel, other slider window configurations may be implemented while remaining within the spirit and scope of the present invention. For example, a window assembly may have a single fixed window panel with one or more movable window panels that is/are movable relative to the fixed window panel between opened and closed positions while the heater grid of the movable window panel/panels remain electrically conductively connected to a power source so that the heater grid/grids may be powered irrespective of whether the movable window/windows is/are opened or closed. Optionally, it is envisioned that aspects of the present invention may be suitable for a vertically movable window panel that has one or more movable window panels that is/are vertically movable relative to one or more fixed window panels of the window assembly.

Although shown and described as having a heater grid and providing electrical power or current to the heater grid to heat or defog or defrost the movable window panel of the rear slider window assembly, it is envisioned that electrical power/current may be provided to the movable window panel (when the movable window panel is closed and at least partially opened) for other functions or purposes while remaining within the spirit and scope of the present invention. For example, electrical power or electrical current or electrically conductive connections may be provided to the movable glass window panel for connecting to a radio antenna established at the movable window panel and/or carrier of the movable window panel (such as for receiving radio antenna signals or the like), or for powering/controlling lights and/or sensors (such as imaging sensors or photosensors or security/motion sensors or the like) established at the movable window panel and/or carrier or frame of the movable window panel, or for powering/controlling an electrical auto-dimming/shading glass panel (such as an electro-optic or electrochromic glass panel or the like) to provide a dimming/shading feature to the movable glass window panel, and/or the like. The electrical connections or electrically conductive connections to the movable window panel allow for provision of electrical power/current to the accessories or features or content of the movable window panel or at the movable window panel and/or may provide a data/signal transmitting/receiving function for the accessories or features or content of or at the movable window panel, with the connections providing such power/current/transmission/communication irrespective of the position of the movable window panel between its fully closed position and its fully opened position.

Thus, and in accordance with the present invention, electrical conductive continuity and hence heating via the electrically conducting heater traces (or other electrically conductive traces or elements established at the movable window panel) is maintained whether or not the central sliding or movable window panel is opened or closed or partially opened or partially closed. Thus, a driver of the equipped vehicle can opt to, for example, at least partially open the sliding window for ventilation purposes or the like, and still maintain the benefit of a heatable central sliding window panel for demisting and/or defogging and/or defrosting purposes.

Changes and modifications to the specifically described embodiments may be carried out without departing from the principles of the present invention, which is intended to be limited only by the scope of the appended claims, as interpreted according to the principles of patent law.

The invention claimed is:

1. A rear slider window assembly for a vehicle, said rear slider window assembly comprising:
   a frame portion having an upper rail and a lower rail;
   a fixed window panel that is fixed relative to said frame portion;
   a movable window panel that is movable along said upper and lower rails, wherein said movable window panel is movable between a closed position and an opened position;
   wherein said movable window panel has a first electrical element established at a surface of said movable window panel;
   wherein said first electrical element is in electrical connection with a power source of the vehicle and remains in electrical connection with the power source of the vehicle irrespective of whether said movable window panel is in said opened position or said closed position;
   wherein said first electrical element is in electrical connection with the power source of the vehicle via a flexible cable that has one end secured to and electrically connected to a first electrical connector at said first electrical element at said movable window panel, and wherein another end of said flexible cable is secured to and electrically connected to a second electrical connector at said fixed window panel;
   wherein said flexible cable flexes in response to movement of said movable window panel relative to said fixed window panel;
   wherein said flexible cable comprises conductive wires disposed in and along an overmolded serrated polymeric wire sheath; and
   wherein said flexible cable is flexible in a flexing direction while being substantially non-flexible in a non-flexing direction, said non-flexing direction being generally transverse to said flexing direction; and
   wherein said serrated polymeric wire sheath has serrations along one side region of said serrated polymeric wire sheath so as to be flexible in said flexing direction while being substantially non-flexible in said non-flexing direction.

2. The rear slider window assembly of claim 1, wherein said first electrical element comprises a first heater grid established on said movable window panel, and wherein a second heater grid is established on said fixed window panel.

3. The rear slider window assembly of claim 2, wherein said first and second heater grids comprise a plurality of electrically conductive traces disposed at said respective window panels.

4. The rear slider window assembly of claim 1, wherein said fixed window panel comprises a first fixed window panel and wherein said rear slider window assembly comprises a second fixed window panel with an opening between said first and second fixed window panels, and wherein said movable window panel is movable between said closed position and said opened position relative to said opening, and wherein each of said fixed window panels has an electrical element established at a surface of the respective fixed window panel.

5. The rear slider window assembly of claim 1, wherein said fixed window panel comprises a single panel with an aperture formed therethrough, and wherein said movable window panel is movable between said closed position and said opened position relative to said opening, and wherein an electrical element is established at a surface of said fixed window panel at opposite sides of said opening.

6. The rear slider window assembly of claim 1, wherein a wire guide is disposed at said fixed window panel and wherein said flexible cable is routed along said wire guide.

7. The rear slider window assembly of claim 6, wherein said wire guide has an arcuate inner surface that curves along the length of said wire guide and wherein said flexible cable engages said arcuate inner surface as said movable window panel is opened and closed.

8. The rear slider window assembly of claim 1, wherein said flexing direction is generally horizontal when said rear slider window assembly is mounted in the vehicle.

9. A rear slider window assembly for a vehicle, said rear slider window assembly comprising:
   a frame portion having an upper rail and a lower rail;
   a fixed window panel that is fixed relative to said frame portion;
   a movable window panel that is movable along said upper and lower rails, wherein said movable window panel is movable between a closed position and an opened position;
   wherein said movable window panel has a first electrical element established at a surface of said movable window panel, and wherein said first electrical element comprises a heater grid;

wherein said fixed window panel has a second electrical element established at a surface of said fixed window panel, and wherein said second electrical element comprises a heater grid;

wherein said first electrical element is in electrical connection with a power source of the vehicle and remains in electrical connection with the power source of the vehicle irrespective of whether said movable window panel is in said opened position or said closed position;

wherein said first electrical element is in electrical connection with the power source of the vehicle via a flexible cable that has one end secured to and electrically connected to a first electrical connector at said first electrical element at said movable window panel, and wherein another end of said flexible cable is secured to and electrically connected to a second electrical connector at said fixed window panel;

wherein said flexible cable flexes in response to movement of said movable window panel relative to said fixed window panel;

wherein a wire guide is disposed at said fixed window panel and wherein said flexible cable is routed along said wire guide;

wherein said wire guide has an arcuate inner surface that curves along the length of said wire guide and wherein said flexible cable engages said arcuate inner surface as said movable window panel is opened and closed;

wherein said flexible cable comprises conductive wires disposed in and along an overmolded serrated polymeric wire sheath;

wherein said flexible cable is flexible in a flexing direction while being substantially non-flexible in a non-flexing direction, said non-flexing direction being generally transverse to said flexing direction, and wherein said flexing direction is generally horizontal when said rear slider window assembly is mounted in the vehicle; and wherein said serrated polymeric wire sheath has serrations along one side region of said serrated polymeric wire sheath so as to be flexible in said flexing direction while being substantially non-flexible in said non-flexing direction.

10. The rear slider window assembly of claim 9, wherein said first and second heater grids comprise a plurality of electrically conductive traces disposed at said respective window panels.

11. The rear slider window assembly of claim 9, wherein said fixed window panel comprises a first fixed window panel and wherein said rear slider window assembly comprises a second fixed window panel with an opening between said first and second fixed window panels, and wherein said movable window panel is movable between said closed position and said opened position relative to said opening, and wherein each of said fixed window panels has an electrical element established at a surface of the respective fixed window panel.

12. The rear slider window assembly of claim 9, wherein said fixed window panel comprises a single panel with an aperture formed therethrough, and wherein said movable window panel is movable between said closed position and said opened position relative to said opening, and wherein an electrical element is established at a surface of said fixed window panel at opposite sides of said opening.

* * * * *